3,595,943
HOT MELT COATING COMPOSITIONS FOR PRINTED SHEETS AND COATED, LENTICULATED SHEETS HAVING 3–D APPEARANCE
Marion O. Brunson, Brecksville, Ohio, and Ted L. Douglas, Kingsport, Tenn., assignors to Eastman Kodak Company, Rochester, N.Y.
No Drawing. Continuation-in-part of application Ser. No. 685,957, Nov. 27, 1967. This application Apr. 5, 1968, Ser. No. 719,217
Int. Cl. C08f 29/12
U.S. Cl. 260—897B                                 8 Claims

ABSTRACT OF THE DISCLOSURE

Flexible sheets (such as paper) having a three dimensional (3–D) appearance have a printed stereographic image coated with a hot melt coating composition having on its surface a lenticulated pattern, said coating composition being essentially (50–100%) composed of maleated polyethylene. About 5 to 45% of the coating composition may be a copolymer of ethylene and either an alkyl (1–8 carbons) acrylate or a vinyl alkanoate (1–8 carbons). Such coating compositions as contain 5–45% copolymer (70 to 95% ethylene-30 to 5% ethyl acrylate) have even greater adhesion to both paper and ink-printed areas, and also other desirable properties, e.g. resist blocking, stain resistant, withstand folding, resist stress cracking, abrasion resistant, possess inherent stability with little or no additives, etc.

---

This application is a continuation-in-part of our application Ser. No. 685,957 filed on Nov. 27, 1967, now abandoned.

This invention relates to flexible sheets having a three dimensional (3–D) appearance and compositions employed in coating especially prepared images such as printed or photographic materials to give a 3-dimensional effect.

The direct application of various plastic coating compositions, in the hot melt or molten state, to paper and similar substrates, has found increasing commercial use, avoiding, as it does, the necessity of employing solvents or like carriers with possible adverse effects on the substrate, and obviating the necessity of attendant solvent recovery systems. It has been found, however, that in order to provide satisfactory coatings, particularly for paper webs carrying colored pictures, printing, or the like, it is important that, in addition to strong adhesive properties, the coating should be resistant to blocking and abrasion, as well as having high resistance to grease, stains, and the like. This is especially true in cases wherein the coated substrate is subjected to embossing to form a lenticulated surface. Moreover, 3-dimensional printing operations and associated techniques require special attributes for the resinous coating composition.

In previous hot melt coating compositions having some of the important characteristics just mentioned, problems involving poor adhesion have been encountered, and it has been believed quite advantageous to incorporate some type of synthetic resin, natural resin or modified natural resin as an additive, e.g. pinene based resins (see Hagemeyer and Etter Ser. No. 404,775 filed Oct. 19, 1964) in order to provide a high degree of adhesion between the coating and substrate, e.g. printed material such as paper. It has been found, however, that incorporation of such resinous additives frequently results in several disadvantages. Possibly the most important problem is that such additives generally have less than the desired aging characteristics, resulting in degradation of the hot melt composition either in extended storage or after it has been applied to the substrate such as 3-dimensional printing bases.

Another problem encountered in the case of the compositions containing pinene based resins or the like is the tendency of the hot melt coating compositions to stick to the embossing cylinder. Furthermore, such additive resins as those of the pinene type generally impart color to the hot melt compositions. Also processability is generally adversely affected. Moreover, adhesive properties may vary in an unpredictable manner depending on the type of ink and/or paper.

According to one embodiment of this invention there is provided a flexible sheet having a three dimensional appearance which has on at least one side a stereographic image coated with a transparent layer of a coating composition having on its surface a lenticulated pattern, said coating composition being essentially composed of maleated polyethylene.

According to a more specific embodiment of this invention there is provided a sheet as defined in the above paragraph wherein said coating composition comprises 55 to 95% by weight of maleated polyethylene and 5 to 45% by weight of a copolymer or mixture of copolymers of ethylene and an alkyl acrylate, alkyl methacrylate or vinyl alkanoate wherein each of said alkyl and alkanoate radicals contain from 1 to 8 carbon atoms, the ethylene content of the copolymer is from 60 to 95% by weight of the copolymer, and the maleated polyethylene has a saponification number in the range between about 2 and about 10.

Preferably the coating composition has a melt viscosity at 150° C. in the range between about 1,000 and about 100,000 cps.

Even more specifically, according to this invention, there is provided a sheet as defined above wherein said maleated polyethylene incorporated in said composition has a density in the range between about 0.89 and about 0.97, has a melt viscosity at 150° in the range between about 1,000 and about 100,000 cps., and has a saponification number in the range from about 2 to about 10, and said copolymer incorporated in said composition has a melt index in the range between about 15 and about 250 and a density in the range between about 0.90 and 0.98.

Most advantageously said copolymer contains in the range between about 5 to about 30% by weight of ethyl acrylate and has a density in the range between about 0.915 and 0.950.

Novel coating compositions, in accordance with another embodiment of this invention, are provided by those compositions composed of 55–95% by weight of maleated polyethylene and 5–45% by weight of a copolymer or mixture of copolymers of ethylene and an alkyl acrylate, alkyl methacrylate or vinyl alkanoate wherein each of said alkyl and alkanoate radicals contain from 1 to 8 carbon atoms, the ethylene content of the copolymer is from 60 to 95% by weight of the copolymer, and the maleated polyethylene has a saponification number in the range between about 2 and about 10.

This invention provides excellent hot melt compositions having sufficient flexibility to withstand folding, excellent adhesion to essentially all types of paper and printing inks, high resistance to blocking and staining, as well as to abrasion; moreover, these compositions are non-toxic, colorless, have excellent heat stability and have improved resistance to stress cracking.

An especially preferred composition range has been found to be:

| | Percentages by wt. |
|---|---|
| Reaction product of polyethylene and maleic anhydride | 70–100 |
| Ethylene-ethyl acrylate copolymer | 30–0 |

In producing the maleated polyethylene resin employed according to this invention, maleic anhydride and polyethylene can be advantageously reacted at a temperature of from 200° C.–400° C., in the absence of oxygen and catalyst, for from about 15 minutes to 4 hours, the reaction time being dependent on the temperature. The resulting product can then be advantageously refined by removal of excess maleic anhydride, e.g. by purging the reaction product with an inert gas such as nitrogen while the melt temperature is between 200° C. and 300° C. The product can then be employed as such in conventional hot melt applications or, according to another embodiment of this invention, it can be blended with a compatible polymer or copolymer of ethylenically unsaturated monomers such as copoly(ethylene-vinyl acetate), copoly-(ethylene - methyl acrylate), copoly(ethylene-isobutyl acrylate), copoly(ethylene-methyl methacrylate), or the like, especially an ethylene-ethyl acrylate copolymer in ratios such as those previously disclosed as representing a preferred composition.

In a preferred aspect of this invention, polyethylenes having a density in the range between about 0.89 and about 0.97 and melt viscosity in the range between about 1,000 and about 100,000 cps. at 150° C., are reacted with 0.5% to 5.0% maleic anhydride at a temperature between 200° C. and 320° C. for a period of 15 minutes to one hour. The resulting product is then refined by purging with nitrogen. The maleated polyethylene produced may have a melt viscosity in the range between about 1,000 and about 100,000 cps. at 150° C. and a saponification number from 1 to 2 to about 10. It may then advantageously be blended with 5 to 50% by weight of ethylene-ethyl acrylate copolymer of melt index greater than 15 (e.g. 15–250), density of 0.915 to 0.950, and containing 10%–30% ethyl acrylate.

A U.S. patent application filed on June 6, 1967, by M. B. Knowles and C. S. Winebarger, Ser. No. 643,872 discloses a process and apparatus for maleating low molecular weight thermally degraded polyolefins including polyethylene using an agitated, multistage reaction zone under essentially plug-type flow conditions; also disclosed is a process for treating maleated polyolefins so as to eliminate noxious gases that may be formed when being used in a molten condition during melt coating, such treatment comprising stripping in a thin film evaporator or the like. This disclosure is incorporated by reference into the present disclosure.

This invention will be further illustrated by the following examples of preferred embodiments, although it will be understood that these examples are included merely for purposes of illustration and are not intended to limit the scope of the invention.

EXAMPLES

Hot melt coating compositions are prepared from constituents having percentages by weight according to the following coating resin formulas; Formulas No. 1 and No. 2 are described and lenticulated coated stereograms are claimed in the above mentioned Hagemeyer and Etter patent application and Formulas No. 8 and No. 9 are described and claimed in Brunson and McGillen U.S. Pat. No. 3,201,498 granted on Aug. 17, 1965, as to which lenticulated coated stereograms are described and claimed in Brunson and Huffaker U.S. Pat. No. 3,275,494 granted on Sept. 27, 1966:

| Component | Resin formula numbers | | | | | | | | |
|---|---|---|---|---|---|---|---|---|---|
| | 1 | 2 | 3 | 4 | 5 | 6 | 7 | 8 | 9 |
| Maleated polyethylene | 0 | 0 | 100 | 90 | 85 | 80 | 70 | 0 | 0 |
| Epolene C-10 | 100 | 69.5 | | | | | | 70 | 80 |
| Epolene C-13 | | 15 | | | | | | | |
| Zetafin 70 | | | | 10 | 15 | 20 | 30 | 30 | 20 |
| Piccopale 100-S | | 10 | | | | | | | |
| Piccolyte S-135 | | 5 | | | | | | | |
| Amide U | | 0.25 | | | | | | | |
| Superfloss | | 0.25 | | | | | | | |

The above components are more specifically identified as follows:

(a) The maleated polyethylene is more specifically characterized in these examples as having a melt viscosity of about 5,000–10,000 cps. at 150° C. and a saponification number of about 5. This maleated polyethylene is from a different production run than that employed in copending McConnell, Ser. No. 693,737, filed on Dec. 27, 1967.

(b) Epolene C–10 is a low density polyethylene having a melt viscosity of about 8,000–10,000 cps. at 150° C., marketed by Eastman Chemical Products, Inc.

(c) Epolene C–13 is a low density polyethylene having a melt viscosity of about 40,000 cps. at 190° C., marketed by Eastman Chemical Products, Inc.

(d) Zetafin 70 is an ethylene-ethyl acrylate copolymer, containing 85% ethylene and having a melt index of about 18.5, marketed by Dow Chemical Company.

(e) Piccopale 100–S is an aliphatic hydrocarbon pinene resin, marketed by Pennsylvania Industrial Chemical Company.

(f) Piccolyte S–135 is a polyterpene resin, marketed by Pennsylvania Industrial Chemical Company.

(g) Amide U is an oleamide, marketed by Humko Chemical Company.

(h) Superfloss is a diatomaceous earth, marketed by Johns-Manville Company.

The hot melt compositions having said formulas are coated on especially printed paper using a hot melt coating and embossing machine made by the Harris-Seybold Company; see Norton U.S. Pat. No. 3,317,334 granted on May 2, 1967. The following conditions are maintained:

Coating cylinder—320° F.
Embossing cylinder—20° F.
Melt temperature—260° F.
Machine speed—1870 sheets/hour
Coating thickness—10 mils.

The ink-printed paper test specimens employed are on Kromekoat paper, made by Champion Paper Company with a lithographically reproduced grey scale which is a 3-color ink-printed test gradient having bands of colored dots covering from 100% down to none of the area in each band. The grey scale is printed in two directions in order to eliminate possible error in adhesion values due to embossing cylinder pressure. The processability of the coating composition was excellent; at least 150 sheets are coated and embossed without sticking to the embossing cylinder.

Adhesion ratings are set on the grey scale as follows:

| Rating | Coating sticks to paper specimens as follows: |
|---|---|
| −1 | Does not stick to ink printed areas nor to the paper. |
| 0 | Sticks to paper only, not to ink printed areas. |
| 1 | Sticks where approximately 25% of specimen is printed. |
| 2 | Sticks where approximately 50% of specimen is printed. |
| 3 | Sticks where approximately 75% of specimen is printed. |
| 4 | Sticks where 100% of specimen is printed. |

Adhesion ratings of −1 were given to resin formulas that did not stick to either the paper or the ink-printed areas. Ratings of 0 were given to resin formulas that stuck to the paper but not to an ink-printed area. Ratings of 1-4 were given depending on the extent that the resin formulas stuck to the printed grey scale as set forth in the above tabulation of adhesion ratings. The determination is based on ink density at which fiber tear occurs during peeling of the coating from the printed paper.

After the hot melt compositions having the above formula numbers are coated on the stereographically printed paper as described above, specimens thereof are aged for 72 hours and 168 hours and evaluated as to adhesion ratings described above by two operators on the grey scales printed in both directions. The following results are averages based on 5 specimens picked at random from a stack of 50 coated and embossed sheets:

| Formula Numbers | Adhesion evaluation after aging | | | |
|---|---|---|---|---|
| | 72 hours | | 168 hours | |
| | Operator 1 | Operator 2 | Operator 1 | Operator 2 |
| 1 | −1 | −1 | −1 | −1 |
| 2 | 2.0 | 2.3 | 2.1 | 2.1 |
| 3 | 3.4 | 3.4 | 3.4 | 2.9 |
| 4 | 3.5 | 3.5 | 3.9 | 3.6 |
| 5 | 3.6 | 3.0 | 3.5 | 3.5 |
| 6 | 4.0 | 3.8 | 4.0 | 3.9 |
| 7 | 4.0 | 3.8 | 4.0 | 4.0 |
| 8 | −1 | −1 | −1 | −1 |
| 9 | −1 | −1 | −1 | −1 |

It is noted that Formula No. 3 in the above table is essentially the same as Formula No. 1 in the above-mentioned McConnell application, but the production runs for producing these formulas were different and the adhesion ratings were on a different scale using a 3-color (rather than 4-color) test gradient and using a scale from −1 to 4 rather than from −1 to 5.

All of the above formulas are used to prepare stereograms (embossed printed sheets having 3-D appearance) on the machinery at standard settings without sticking to the embossing cylinder or jamming the coater for a continuous run of 150 sheets, thereby passing what is known as a processability test. Formula numbers 3 through 7 are especially advantageous as to processability.

The adhesion data obtained on formula numbers 3 through 7 are submitted to mathematical analysis which shows that increases in ethylene-ethyl acrylate copolymer content in the modified polyethylene formula numbers significantly increased adhesion in an unexpected manner whereby the presence of 5% to 45% copoly(ethylene-ethyl acrylate) is especially advantageous.

This invention for the first time makes it possible to use practically any good quality paper as a substrate to form the stereographic sheets of this invention. Heretofore only a small proportion of various types of commercially available paper would give consistently good results and would make it possible to achieve the minimum processability requirements described above. Thus, from 14 types of paper tested, 12 were found to be quite satisfactory from the processability standpoint.

Various additives such as antioxidants, light stabilizers, heat stabilizers, dyes, slip agents, non-blocking agents, pigments or the like may be added, if desired, as is well known in the art.

Although the compositions of this invention are admirably suited to fulfill the exacting requirements for hot melt coatings for specially prepared photographic materials to form lenticulated coatings exhibiting 3-dimensional effects, especially on a discontinuous or spot coating basis, they are not limited to this end use. They are also quite advantageous in many other fields such as, for example, in making both decorative and barrier coatings and, in general, in applications where adhesion over heavily inked substrates is desired such as magazine covers, greeting cards, brochures, and various high quality printed and coated sheets, especially where a discontinuous coating (spot coating) process may be used.

The coating and embossing operations, employing the hot melt compositions of this invention, may follow, in general, the known procedures and use apparatus such as those of U.S. Pats. No. 3,110,608, No. 3,148,059, and No. 3,317,334 and, although a specific film thickness of 10 mils is given in the above examples of the present application, a wider range of thickness may advantageously be employed, such as from 5–40 mils; moreover, greater or smaller thicknesses are also useful in some instances, e.g. 1–50 mils.

The preceding description of this invention is more particularly directed to improved maleated polyethylene; however, this invention also is intended to encompass maleated polyolefins such as polypropylene, polybutene-1, copoly(propylenebutene-1) and other homopolymers, copolymers, block copolymers, polyallomers, and the like, of alpha-monoolefins having up to 10 carbon atoms.

This invention has been described in detail and illustrated by preferred embodiments but it should be understood that many modifications can be made within its spirit and scope as previously defined and as summarized in the appended claims.

We claim:

1. A coating composition comprising 55–95% by weight of maleated polyethylene and 5–45% by weight of a copolymer or mixture of copolymers of ethylene and an alkyl acrylate, alkyl methacrylate or vinyl alkanoate wherein each of said alkyl and alkanoate radicals contain from 1 to 8 carbon atoms, the ethylene content of the copolymer is from 60 to 95% by weight of the copolymer, and the maleated polyethylene has a saponification number in the range between about 2 and about 10.

2. A coating composition as defined by claim 1 wherein said coating composition has a melt viscosity at 150° C. in the range between about 1,000 and about 100,000 cps.

3. A coating composition as defined by claim 2 wherein said maleated polyethylene incorporated in said composition has a density in the range between about 0.89 and about 0.97, has a melt viscosity at 150° in the range between about 1,000 and about 100,000 cps., and has a saponification number in the range from about 2 to about 10, and said copolymer incorporated in said composition has a melt index in the range between about 15 and about 250 and a density in the range between about 0.90 and 0.98.

4. A coating composition as defined by claim 3 wherein said copolymer contains in the range between about 5 to about 30% by weight of ethyl acrylate and has a density in the range between about 0.915 and 0.950.

5. A flexible sheet having a three dimensional appearance which has on at least one side a stereographic image coated with a transparent layer of a coating composition having on its surface a lenticulated pattern, said coating composition comprising 55 to 95% by weight of maleated polyethylene and 5 to 45% by weight of a copolymer or mixture of copolymers of ethylene and a alkyl acrylate, alkyl methacrylate or vinyl alkanoate wherein each of said alkyl and alkanoate radicals contain from 1 to 8 carbon atoms, the ethylene content of the copolymer is from 60 to 95% by weight of the copolymer, and the mealeated polyethylene has a saponification number in the range between about 2 and about 10.

6. A sheet as defined by claim 5 wherein said coating composition has a melt viscosity at 150° C. in the range between about 1,000 and about 100,000 cps.

7. A sheet as defined by claim 6 wherein said maleated polyethylene incorporated in said composition has a density in the range between about 0.89 and about 0.97, has a melt viscosity at 150° in the range between about 1,000 and about 1000,00 cps., and has a saponification number in the range from about 2 to about 10, and said copolymer incorporated in said composition has a melt index in the range between about 15 and about 250 and a density in the range between about 0.90 and 0.98.

8. A sheet as defined by claim 7 wherein said copolymer contains in the range between about 5 to about 30% by weight of ethyl acrylate and has a density in the range between about 0.915 and 0.950.

References Cited

UNITED STATES PATENTS

| | | | |
|---|---|---|---|
| 3,284,380 | 11/1966 | Davis | 260—8 |
| 3,440,194 | 4/1969 | Taranto et al. | 260—28.5 |
| 3,475,369 | 10/1969 | Blunt | 260—33.6 |
| 3,148,059 | 9/1964 | Brunson et al. | 161—2 |

FOREIGN PATENTS

| | | | |
|---|---|---|---|
| 946,384 | 1/1964 | Great Britain | 260—94.9 |

MURRAY TILLMAN, Primary Examiner

C. J. SECURRO, Assistant Examiner

U.S. Cl. X.R.

96—27; 117—10, 14, 15, 68, 161UT, 155, 161UH, 161UC; 16—2; 260—94.96D, 876R; 350—131.